United States Patent Office 3,338,261
Patented Aug. 29, 1967

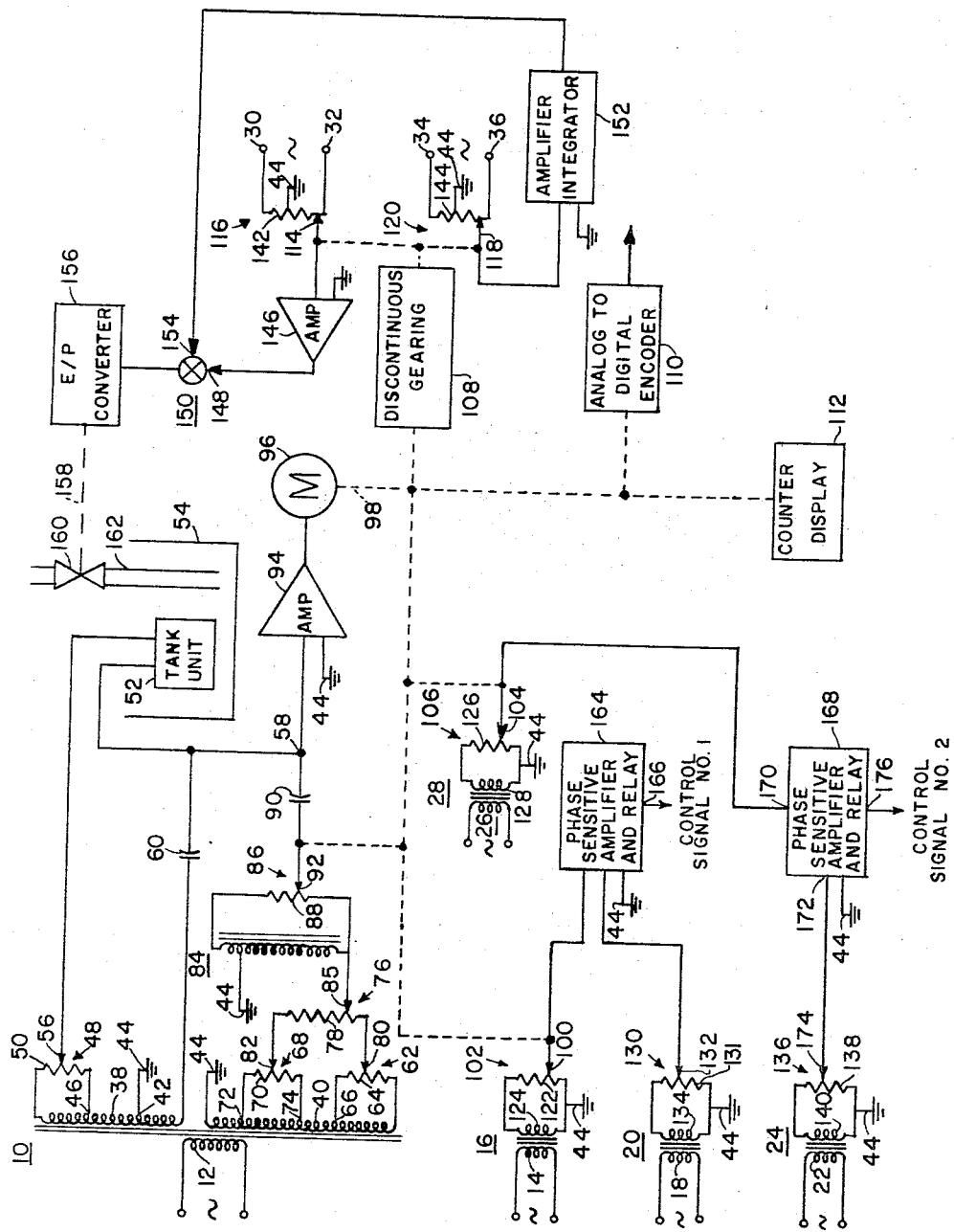

3,338,261
CONTROL APPARATUS
Raymond L. Bergeson, St. Paul, and Jack W. Schuck, Hopkins, Minn., assignors to Honeywell Inc., a corporation of Delaware
Filed Dec. 27, 1963, Ser. No. 333,906
13 Claims. (Cl. 137—386)

The invention described herein was made in performance of work under a NASA contract and is subject to the provisions of the National Aeronautics Space Act of 1958, Public Law 85–568 (72 Stat. 426; 42 U.S.C. 2451), as amended.

This invention pertains generally to fuel gaging apparatus and is more specifically concerned with a fuel gage computer which will automatically fill a fuel tank to a desired level and further will maintain the level in the fuel tank at a desired point while providing a percentage indication of the level of the fuel in the tank as a percentage of the desired level.

While the prior art has contained fuel gage units which will give indication of fluid quantity in a tank, these fuel gage units were not adaptable to provide percentage indications of any desired amount of fuel in the tank. Such an indication was not particularly needed since a person normally had to control the process of filling the tank to whatever level was desired by that individual and be there to shut off the controls when the fluid reached the desired level. However, with such fuels as hydrogen, there became a need for having a continuous additional supply of fluid or fuel since hydrogen is constantly bubbling off and dispersing into the air. This reduces the quantity of fluid in the tank and requires an additional supply. This means that either the tank was not kept at the desired level continuously or else that a person must be on the job continually to maintain a full condition in the tank.

The present apparatus, however, has control such that a desired level of fuel can be set on a control means and this level of fuel can be maintained by the apparatus after automatically filling the tank to that level. Further, since the output of the present apparatus is in percentage of desired indication, there is no need for interpolation to obtain a reading of how nearly the amount of fuel in the tank approaches the desired level.

Another feature of prior art units which is improved by the present invention is that prior art units required a separate level sensor for each level indication wherein some type of warning signal was required for a certain level of fluid. The present invention by incorporating phase sensitive amplifiers which have one input controlled by the output percentage indicator, can provide a plurality of level control signals all of which use the one tank unit as their source of indicating level. In this way many separate level sensors are eliminated. Further, since the only adjustment required to change the desired warning level is the adjustment of a voltage divider such as a potentiometer, the ease of obtaining a warning at a given point or level is made much simpler and easier. Therefore, the present invention not only simplifies the task of filling a tank to a desired level and maintaining this tank at the desired level, but also discloses a cheaper means for additionally providing output signals which give indications that the fuel is at a desired level.

It is an object of this invention to provide apparatus which will automatically fill a tank to a desired level of fluid and to maintain the fluid at this level.

Further objects and advantages of this invention will be apparent from a reading of the specification and appended claims in conjunction with the single drawing which is a semi-block diagram schematic of the fuel gage computer apparatus.

A transformer 10 has a primary winding 12 connected to a source of power which is not shown. This same source of power is also connected to the primary winding 14 of a transformer generally designated as 16, to a primary winding 18 of a transformer generally designated 20, to a primary winding 22 of a transformer generally designated at 24, and to a primary winding 26 of a transformer generally designated as 28. It is to be realized that one transformer with many secondary windings may be used in place of the five transformers designated. Another source of power of a lower potential but of the same general phase characteristics is connected between terminals 30 and 32 and also between terminals 34 and 36. The transformer 10 has two secondary windings 38 and 40. Secondary winding 38 has a tap 42 connected to a common connection or ground 44 and has another tap 46. A potentiometer generally designated as 48 has a resistance element 50 connected between one end of secondary winding 38 and tap 46. A tank unit, generally designated as 52, situated in a fuel quantity tank or fluid container 54, is connected between a wiper 56 of potentiometer 48 and a summing point or summing means 58. A reference capacitor 60 is connected between the other end of secondary winding 38 and the summing point 58. One end of secondary winding 40 is connected to ground 44. A potentiometer generally designated as 62 has a resistance element 64 connected between the other end of winding 40 and a tap 66. A second potentiometer 68 has a resistance element 70 connected between taps 72 and 74 on secondary winding 40. A potentiometer generally designated as 76 has a resistance winding 78 connected between a wiper 80 of potentiometer 62 and a wiper 82 of potentiometer 68. An autotransformer or signal converting means generally designated as 84 is connected between a wiper 85 of potentiometer 76 and ground 44. A potentiometer or variable resistance means generally designated as 86 has a resistance element or resistance winding means 88 connected between the two ends of the signal converting means 84. A capacitor 90 is connected between a wiper 92 of potentiometer 86 and the summing point 58. The summing point 58 is connected to an input of an amplifier or amplifying means generally designated as 94 which has another input connected to ground 44. An output of amplifier 94 is connected to an input of a motor 96 which receives reference phase power from a source not shown. A mechanical output 98 of motor 96 is shown connected to various points such as wiper 92 of potentiometer 86, a wiper 100 of a potentiometer generally designated as 102, a wiper 104 of a potentiometer generally designated as 106, a discontinuous gearing box 108, an analog to digital encoder 110, and the input of a counter display or indicator 112. The discontinuous gearing 108 has a further mechanical output connected to drive a wiper 114 of a potentiometer generally designated as 116 and a wiper 118 of a potentiometer generally designated as 120. This discontinuous gearing only operates between the 95 and 105 percent of full points as indicated on either the potentiometer 86 or the counter display 112. This limitation of movement of the discontinuous gear is arbitrary and is merely one example of a range which may be used to provide a workable system. The potentiometer 102 has a resistance element 122 connected across a secondary winding 124 of the transformer 16. The potentiometer 106 has a resistance element 126 connected across a secondary winding 128 of transformer means 28. A potentiometer generally designated as 130 has a resistance element 131 connected across a secondary winding 134 of transformer 20. Potentiometer 130 also has a wiper 132. A potentiometer generally designated as 136 has a resistance element 138 connected across a secondary winding 140 of the transformer 24. The potentiometer 116 has a resistance element 142 connected between the terminals 30 and 32 and also has a tap connected to ground 44 at some point on the resistance winding 142. The potentiometer 120 has a resistance element 144 which has a tap connected to ground 44. The resistance element 144 is connected between terminals 34 and 36. Wiper 114 of potentiometer 116 is connected to an input of an amplifier 146 which has an output connected to an input 148 of a summing means generally designated as 150. An amplifier integrator or integrating means 152 has an input connected to wiper 118 of potentiometer 120. An output of the integrating means 152 is connected to an input 154 of the summing means 150. An output of summing means 150 is connected to an input of an electrical to pressure converter or transducer means 156. Transducer means 156 is connected by a mechanical connection 158 to a valve or other control means 160 in series with a conduit means or pipe supply means 162. The pipe 162 is attached to the tank 54 for supplying fluids thereto. Wipers 100 and 132 of potentiometers 102 and 130 respectively supply inputs to a phase sensitive amplifier and relay means 164. Phase sensitive amplifier 164 is also connected to ground 44. The phase sensitive amplifier 164 has an output 166 which may be used to control a warning means, a warning light or some other type of load for indicating that a predetermined level has been reached in the fuel tank 54. A phase sensitive amplifier and relay means 168 has an input 170 connected to potentiometer wiper 104 of potentiometer 106. An input 172 of phase sensitive amplifier 168 is connected to a wiper 174 of potentiometer 136. The phase sensitive amplifier 168 is also connected to ground 44. An output 176 of phase sensitive amplifier 168 is utilized to control a load means, a warning means, or an indicating means that a second predetermined level or fluid has been reached in the tank 54.

There are many different types of fuel gage bridge circuits and the operation of most of these fuel gage circuits is quite similar. An example of one of the more basic circuits is very completely described in a patent to Franzel et al. 3,037,385 issued June 5, 1962, and assigned to the same assignee as the present invention. The present fuel gage circuit has an additional concept over the Franzel patent in the use of the autotransformer 84 and the additional potentiometer 76. As is known to those skilled in the art the current attributed to the empty tank capacitance of tank unit 52 is counterbalanced by the current through capacitor 60 which is sometimes referred to as a reference capacitor. Therefore the total current from the combination of tank unit 52 and capacitor 60 is indicative of only the fuel in tank 54. When the current through capacitor 90 equals the summation currents of capacitors 60 and 52, rebalance conditions are achieved and the indication provided by the gearing in conjunction with the rebalance wiper 92 provides an indication of the amount of fuel in the tank 54. However, this circuit was designed such that the full point in tank 54 could be preset by the potentiometer 76. In other words, this potentiometer determines what a full condition is to be in the fuel gaging apparatus. In the tank 54 is 60 percent full of fuel as compared with its total capacity, and if the wiper 85 of potentiometer 76 is set at a 60 percent point, there will be a rebalance current to the amplifier 94 and therefore to motor 96 until wiper 92 of potentiometer 86 moves toward the end of resistance element 88 which is connected directly to wiper 85. Since the full point in tank 54 can be varied, it is necessary that the output indication of amount of fuel be in percentage of a full point rather than in pounds of fuel. This can be seen in view of the fact that if wiper 85 is set at a 60 percent point, the wiper 92 will indicate 100 percent even though the tank 54 is only filled to 60 percent of capacity. If, however, the wiper 85 is set to the 100 percent or full mark, the wiper 92 will be indicating a 60 percent full value while the fluid level in the tank 54 has not changed from its 60 percent level.

In order to set up the fuel gage unit for obtaining accurate indications the following procedure may be used. First, the tank 54 is emptied of all fuel and the wiper 56 on potentiometer 48 is adjusted to provide an empty or zero condition on the counter display 112 or the potentiometer 86. Then, the tank 54 is filled to a maximum amount of fluid or, a parallel capacitance is connected across tank unit 52 to simulate a full tank condition. With wiper 85 adjusted to the full point on potentiometer 76, the wiper 80 of potentiometer 62 is adjusted to obtain the full or 100 percent indication on wiper 92 of potentiometer 86 or again on the counter display 112. Some minimum amount of adjustment will be indicated on potentiometer 76 and in one embodiment this amount is 60 percent, if such is the case, the tank 54 is filled to a 60 percent level of fuel and at this point the wiper 82 of potentiometer 68 is adjusted so that with wiper 85 at the 60 percent mark, the wiper 92 of potentiometer 86 is at the full or 100 percent point on resistance element 88. These foregoing steps will place the bridge circuit in operational condition.

The analog to digital encoder 110 is shown attached to motor output 98 such that a digital output signal may be utilized for providing an indication wherever this might be necessary or desirable. The discontinuous gearing 108 is also connected to motor output 98. In one embodiment this discontinuous gearing operates between 95 and 105 percent of the indicated value as set by potentiometer 76. As long as the wiper 92 indicates some value less than 95 percent, the discontinuous gearing 108 does not move the wipers 114 and 118 of potentiometers 116 and 120 respectively. Therefore, as long as the fuel level in the tank is below 95 percent of the set value, the wipers 114 and 118 will be at a point on resistance elements 142 and 144 respectively such that maximum output signals are obtained from these wipers. The signal from wiper 114 is applied through amplifier 146 to summing means 150 and from there to the electrical to pressure converter 156. This converter operates valve 160 so as to allow a maximum amount of fuel to flow into tank 54. The signal from wiper 118 is time integrated by integrator 152 and applied to converter 156 through summing means 150. However, the integrator has no particular effect under these conditions since the valve is in a full ON condition from the signal of amplifier 146. When the wiper 92 reaches a point which is 95 percent of the set value, the signal to amplifier 146 starts decreasing. It may be assumed for the moment that the maximum system effect due to the output from integrator 152 is quite small compared with the maximum output from amplifier 146. With such being the case, the valve 160 will start closing. As the tank gets closer to the desired amount of fuel, the wiper 114 will continue moving toward the ground point 44 on resistance element 142. The signal applied to the converter 156 therefore continually decreases and continually closes the valve 160. Since it requires a signal to converter 156 to hold valve 160 in an open condition, and further since the input to amplifier 146 becomes less as wiper 114 approaches the ground point 44 on resistance element 142, there will never be enough input signal from amplifier 146 to converter 156 to hold valve 160 open until the tank reaches 100 percent of the desired level or fuel quantity. However, the integrator does have an output, as previously mentioned, which holds the valve 160 partially open until the tank quantity is slightly more than 100 percent. This will provide a signal from wiper 118 to integrator 152 to reduce the output to 152 to a value which produces stable or equilibrium conditions.

When fluids such as hydrogen are being measured, the portion of the circuit incorporating the integrator 152 is a very desirable feature since the integrator will maintain a constant output signal with no input signal. In other words, even though the wiper 118 is exactly at ground potential therefore indicating that the tank is exactly at 100 percent of the desired capacity, the integrator 152 will still provide an output signal to converter 156 to hold the valve partially open. Thus, a constant stream of fluid will flow into tank 54 to maintain the desired level of fuel even though the fuel is constantly boiling off and escaping from the tank 54. If the output from integrator 152 holds the valve 160 too far open, the indicator will register more than 100 percent and the wiper 118 will start providing an output signal of the opposite phase to decrease the output amplitude of integrator 152 and to thereby obtain or maintain the proper flow conditions through conduit 162.

Tests with one embodiment of this apparatus have found that the system can stabilize such that valve 160 will be opened to exactly the right amount in approximately 80 seconds after the level of the tank unit 54 is disturbed by one means or another. It will be realized by those skilled in the art that the integrator 152 may be eliminated in some applications depending on accuracy requirements.

As previously indicated, the motor output 98 controls the wipers 100 and 104 of potentiometers 102 and 106 respectively. These wipers are moved such that when there is an output indication of zero percent these wipers are at one end of the resistance element in the potentiometer while with an indication of 100 percent, the wipers are at the opposite end of the resistance element. If the signal from potentiometer 106 is combined or added to another signal such as may be obtained from potentiometer 136, the resultant signal will be of one phase or the opposite phase depending upon whether the signal from potentiometer 106 is of a greater or lesser amplitude than the signal obtained from potentiometer 136. With this in mind, these two signals can be either combined and applied to phase sensitive amplifier 168 or combined within the phase sensitive amplifier 168 so as to provide an output only when the resultant signal is of a given phase with respect to some reference which is not shown. In this manner, an output control signal or warning signal may be obtained whenever the fluid level is greater than a predetermined amount. Conversely, utilizing the opposite phase input signals, an output may be obtained whenever the fluid level is less than a predetermined amount. This predetermined amount is determined by setting the wipers on the potentiometers 130 and 136 so as to obtain an output at some desired percentage level of the amount set by the wiper 85 on potentiometer 76.

While it is believed that the entire computer is a new and novel invention, it is also believed that novelty resides in the method of obtaining a plurality of control or warning signals without requiring the use of more than one sensing element. Another point of novelty is the circuitry for obtaining a full indication with whatever amount of fuel may be desired for a particular occasion.

While specific terminology has been resorted to for clarity in describing the apparatus of this invention it is to be realized that this terminology was only for clarity and that terms such as fuel tank unit, fuel and level are not to be considered limiting. The same overall invention may be used for other types of transducers or sensors such as thermistors in the measure of temperature or electrical pressure transducers for measuring pressure. Also, the system may be used to measure many types of fluids other than fuel. Further the term level as used in the specification and claims includes not only level changes in inches, but to mass and quantity changes or indications. The system may easily be adapted for measurement and control of mass indication by methods known to those skilled in the art. Further still, while a motor rebalance system has been described, the system is perfectly adaptable to the use of solid state rebalance systems such as is disclosed in a patent application to Al Valentine, Ser. No. 320,816, which was filed Nov. 1, 1963, and is assigned to the same assignee as the present invention. Therefore, we wish to be limited not by the specification or the drawings but only by the appended claims.

What is claimed is:

1. Apparatus for automatically filling a fuel tank to and maintaining the fuel tank at a desired quantity comprising, in combination:

fuel tank means having a total capacity for a given quantity of fuel;

automatically rebalanceable bridge circuit means including indicator means attached to a motor output, a first potentiometer calibrated for setting a desired amount of fuel in said fuel tank as 100% on said indicator means, and a second potentiometer connected to an output of said first potentiometer and attached to the motor output, said second potentiometer providing a rebalance signal in said bridge circuit means, and said indicator means providing outputs indicating fuel quantities from 0% to over 100% of the desired amount;

first and second variable signal supplying means, said first and second variable signal supplying means supplying output signals which vary in magnitude and reverse in phase;

first means connecting the motor output means of said bridge circuit means to said first and second variable signal supplying means for varying the output signals from said first and second variable signal supplying means from a maximum of a first phase at 95% of full setting to a maximum of a phase opposite the first phase at 105% of the full setting;

conduit means attached to said fuel tank means, said conduit means supplying fuel to said fuel tank means;

electrically operable valve means attached in operative relation to said conduit means for controlling fuel flow therethrough;

summing means connected to said electrically operable valve means, said summing means including input means, and said summing means supplying control signals to said valve means indicative of any input signals supplied to said input means of said summing means;

means connecting said first variable signal supplying means to said input means of said summing means;

integrating means connecting between said second signal supplying means and said input means of said summing means for supplying a signal thereto;

third and fourth variable signal supplying means attached to said motor output means of said bridge circuit means, said third and fourth signal supplying means providing output signals at output means thereof which vary as a function of position of said motor output means;

fifth and sixth variable signal supplying means for providing output signals at output means thereof respectively, said fifth and sixth signal supplying means including calibrated setting means and providing predetermined outputs at given settings on said calibrated setting means;

first phase sensitive means connected to said third and fifth variable signal supplying means for receiving signals therefrom, said first phase sensitive means providing a first warning output when the signals from said third and fifth variable signal supplying means have a predetermined relationship; and second phase sensitive means connected to said fourth and sixth variable signal supplying means for receiving signals therefrom, said second phase sensitive means providing a second warning output when the signals from said fourth and sixth variable signal supplying means have a predetermined relationship.

2. Apparatus for automatically filling a tank to and maintaining the tank at a desired quantity of fluid comprising, in combination:

tank means having a capacity for a given quantity of fluid;

automatically rebalanceable bridge circuit means including indicator means attached to a motor output means, a first potentiometer calibrated for setting a desired amount of fluid in said tank as 100% on said indicator means, and a second potentiometer connected to an output of said first potentiometer and attached to the motor output, said second potentiometer providing a rebalance signal in said bridge circuit means, and said indicator means providing outputs indicating fluid quantities from 0% to over 100% of the desired amount;

first and second variable signal supplying means, said first and second variable signal supplying means supplying output signals which vary in magnitude and change in phase;

first means connecting the motor output means of said bridge circuit means to said first and second variable signal supplying means for varying the output signals from said first and second variable signal supplying means from a maximum of a first phase at 95% of full setting to a maximum of a phase opposite the first phase at 105% of the full setting;

conduit means connected to said tank means, said conduit means supplying fluid to said tank means;

valve means attached in operative relation to said conduit means for controlling fluid flow therethrough as a function of a control signal to said valve means;

summing means connected to said valve means, said summing means including input means, and said summing means supplying control signals to said valve means indicative of any input signals supplied to said input means of said summing means;

means connecting said first signal supplying means to said input means of said summing means;

integrating means connected between said second signal supplying means and said input means of said summing means for supplying a signal thereto;

third variable signal supplying means attached to said motor output means of said bridge circuit means, said third signal supplying means providing an output signal at an output means thereof which varies as a function of position of said motor output means;

fourth variable signal supplying means for providing an output signal at an output means thereof, said fourth signal supplying means including calibrated setting means and providing a predetermined output at a given setting on said calibrated setting means; and phase sensitive means connected to said third and fourth variable signal supplying means for receiving signals therefrom, said first phase sensitive means providing a control function when the signals from said third and fourth variable signal supplying means have a predetermined relationship.

3. Apparatus for automatically filling a tank to and maintaining the tank at a desired quantity of fluid comprising, in combination:

tank means having a capacity for a given quantity of fluid;

automatically rebalanceable circuit means including indicator means attached to an output means of said circuit means, a first means calibrated for setting a desired amount of fluid in said tank as 100% on said indicator means, and a second means connected to an output of said first means and attached to the output means of said circuit means, said second means providing a rebalance signal in said circuit means, and said indicator means providing outputs indicating fluid quantities from 0% to 100% of the desired amount;

first signal supplying means, said first signal supplying means supplying an output signal which varies in magnitude and changes in phase;

means connecting the output means of said circuit means to said first signal supplying means for varying the output signal from said first signal supplying means from a maximum of a first phase at a given amount less than the full setting to a maximum of a second phase at more than 100% of the full setting;

conduit means connected to said tank means, said conduit means supplying fluid to said tank means;

valve means attached in operative relation to said conduit means for controlling fluid flow therethrough, said valve means including input means;

means connecting said first signal supplying means to said input means of said valve means;

second signal supplying means attached to said output means of said circuit means, said second signal supplying means providing an output signal at an output means thereof which varies as a function of said output means of said circuit means;

third signal supplying means for providing an output signal at an output means thereof, said third signal supplying means including calibrated setting means and providing a predetermined output at a given setting on said calibrated setting means; and phase sensitive means connected to said second and third signal supplying means for receiving signals therefrom, said first phase sensitive means providing a control function when the signals from said second and third variable signal supplying means have a predetermined relationship.

4. Apparatus for automatically filling a tank to and maintaining the tank at a desired quantity of fluid comprising, in combination:

tank means having a capacity for a given quantity of fluid;

rebalanceable circuit means including output means and indicator means;

first supplying means, said first signal supplying an output signal which varies in magnitude and changes in phase;

first means connecting the output means of said circuit means to said first signal supplying means for varying the output signal from said first signal supplying means;

conduit means connected to said tank means, said conduit means supplying fluid to said tank means;

valve means attached in operative relation to said conduit means for controlling flow therethrough, said valve means including input means;

means connecting said first signal supplying means to said input means of said valve means;

second signal supplying means for providing an output signal at an output means thereof;

condition sensitive means connected to said output means of said circuit means and to said second signal supplying means for receiving signals therefrom, said condition sensitive means providing a control function when the signals received have a predetermined relationship.

5. Apparatus for automatically filling a fuel tank to and maintaining the fuel tank at a desired quantity comprising, in combination:

fuel tank means having a capacity for a given quantity of fuel;

automatically rebalanceable bridge circuit means including indicator means attached to a motor output means, a first potentiometer calibrated for setting a desired amount of fuel in said fuel tank as 100% on said indicator means, and a second potentiometer connected to an output of said first potentiometer and attached to the motor output, said second potentiometer providing a rebalance signal in said bridge circuit means, and said indicator means providing outputs indicating fuel quantities from 0% to over 100% of the desired amount;

first and second variable signal supplying means, said first and second variable signal supplying means supplying output signals which vary in magnitude and reverse in phase;

first means connecting the motor output means of said bridge circuit means to said first and second variable signal supplying means for varying the amplitude of the output signals from said first and second variable signal supplying means from a maximum of a first phase at 95% to full setting to a maximum of a phase opposite the first phase at 105% of the full setting;

conduit means attached to said fuel tank means, said conduit means supplying fuel to said fuel tank means;

electrically operable valve means attached in operative relation to said conduit means for controlling fuel flow therethrough;

summing means connected to said electrically operable valve means, said summing means including input means, and said summing means supplying control signals to said valve means indicative of any input signals supplied to said input means of said summing means;

means connecting said first variable signal supplying means to said input means of said summing means; and integrating means connected between said second signal supplying means and said input means of said summing means for supplying a signal thereto.

6. Apparatus for automatically filling a tank to and maintaining the tank at a desired quantity of fluid comprising, in combination:

tank means having a capacity for a given quantity of fluid;

automatically rebalanceable bridge circuit means including indicator means attached to a motor output means, first voltage dividing means calibrated for setting a desired amount of fluid in said tank as 100% on said indicator means, and second voltage dividing means connected to an output of said first voltage dividing means and attached to the motor output, said second voltage dividing means providing a rebalance signal in said bridge circuits means, and said indicator means providing outputs indicating fluid quantities from 0% to 100% of the desired amount;

first and second variable signal supplying means, said first and second variable signal supplying means supplying output signals which vary in magnitude and reverse in phase;

first means connecting the motor output means of said bridge circuit means to said first and second variable signal supplying means for varying the output signals from said first and second variable signal supplying means from a maximum of a first phase at 95% of full setting to a maximum of a phase opposite the first phase at 105% of the full setting;

conduit means attached to said tank means, said conduit means supplying fluid to said tank means;

electrically operable valve means attached in operative relation to said conduit means for controlling fluid flow therethrough;

summing means connected to said electrically operable valve means, said summing means including input means, and said summing means supplying control signals to said valve means indicative of any input signals supplied to said input means of said summing means;

means connecting said first variable signal supplying means to said input means of said summing means; and integrating means connected between said second signal supplying means and said input means of said summing means for supplying a signal thereto.

7. Apparatus for filling a tank to and maintaining the tank at a desired quantity of fluid comprising, in combination:

tank means;

automatically rebalanceable circuit means including indicator means operatively attached to an output means of said circuit means;

signal supplying means, said signal supplying means supplying an output signal which varies in magnitude and in phase;

means connecting the output means of said circuit means to said signal supplying means for varying the output signal from said signal supplying means from a maximum of a first phase at a predetermined quantity less than full to a maximum of a second phase at a predetermined quantity more than full;

conduit means attached to said tank means, said conduit means supplying fluid to said tank means;

valve means attached in operative relation to said conduit means for controlling fluid flow therethrough said valve means including input means; and means connecting said signal supplying means in controlling relation to said input means of said valve means.

8. Liquid level gaging means for providing control signals at more than one level using only one sensing unit comprising, in combination:

automatically rebalanceable bridge circuit means including indicator means attached to a motor output means, and a potentiometer attached to the motor output, said potentiometer providing a rebalance signal in said bridge circuit means, and said indicator means providing a percentage output indication;

first and second variable signal supplying means attached to said motor output means of said bridge circuit means, said first and second signal supplying means providing output signals at output means thereof which vary in magnitude as a function of position of said motor output means;

third and fourth variable signal supplying means for providing output signals at output means thereof respectively, said third and fourth signal supplying means including calibrated setting means and providing outputs of predetermined magnitudes at given settings on said calibrated setting means;

first phase sensitive means connected to said first and third signal supplying means for receiving signals therefrom, said first phase sensitive means providing a first warning output when the signals from said first and third variable signal supplying means have a predetermined relationship; and second phase sensitive means connected to said second and fourth variable signal supplying means for receiving signals therefrom, said second phase sensitive means providing a second warning output when the signals from said second and fourth variable signal supplying means have a predetermined relationship.

9. Fluid level gaging means for providing control signals comprising, in combination:

rebalanceable circuit means including output means which provides a signal that varies as a function of fluid level;

first and second variable signal supplying means coupled to the output means of said rebalanceable circuit means, providing output signals at output means thereof which vary in magnitude as a function of fluid level;

first and second reference signal means, providing output signals of predetermined magnitude;

first phase sensitive means connected to the output means of said first variable signal supplying means and also connected to output means of said first reference signal means, said first phase sensitive means providing a warning output when the received signals have a predetermined relationship; and second phase sensitive means connected to the output means of said second variable signal supplying means and also connected to output means of said second reference signal means, said second phase sensitive means providing a warning output when the received signals have a predetermined relationship.

10. Fuel gage bridge circuitry for indicating percentage of a desired full point in a tank of fuel to be gaged comprising, in combination:

first, second and third means for supplying first, second and third power signals respectively of a first phase, said second and third means being adjustable for supplying signals of variable amplitudes;

fourth means for supplying a fourth signal of a phase opposite said first phase;

summing amplifier means including input and output means;

tank unit capacitive means connected between said fourth means and said input means of said summing means for supplying a signal thereto indicative of fuel quantity;

potentiometer means including resistance means and wiper output means;

fifth means connecting said resistance means of said potentiometer means between said second and third means;

reference potential means;

voltage divider means connected between said wiper output means of said potentiometer means and said reference potential means, said voltage divider means including adjustable output means for providing an output signal;

reference capacitor means connected between said first means and said input means of said summing amplifier means, the current flow through said reference capacitor means being substantially equal to the current flow through said tank unit in an empty condition;

sixth means connecting said adjustable output means of said voltage divider means to said input means of said summing amplifier means;

motor means connected to said output means of said summing amplifier means for receiving a signal therefrom and attached to said adjustable output means of said voltage divider means for adjusting the amplitude of the output signal to minimize the effective input signal to said summing amplifier means; and indicator means attached to said motor means and operable in accordance with said motor means for providing a percentage indication of a desired full point in the tank of fuel, the fuel point being determined by the adjustment of said wiper output means of said potentiometer means.

11. Fuel gage bridge circuitry for indicating percentage of a desired full point in a tank of fuel to be gaged comprising, in combination:

first and second means for supplying first and second power signals respectively of a first phase, said second means being adjustable for supplying a signal of variable amplitude;

third means for supplying a third signal of a phase opposite said first phase;

summing means including input and output means;

tank unit capacitive means connected between said third means and said input means of said summing means for supplying a signal thereto indicative of fuel quantity;

first voltage divider means connected to said second means, said first voltage divider means being adjustable for supplying a signal of variable amplitude;

second voltage divider means connected to said first voltage divider means, said second voltage divider means including adjustable output means for providing an output signal;

reference capacitor means connected between said first means and said input means of said summing means, the current supplied by said reference capacitor means being substantially equal to the current supplied by said tank unit in an empty condition;

fourth means connecting said adjustable output means of said second voltage divider means to said input means of said summing means;

motor means connected to said output means of said summing means for receiving a signal therefrom and attached to said adjustable output means of said second voltage divider means for adjusting the amplitude of the output signal to minimize the effective input signal to said summing means; and indicator means attached to said motor means and operable in accordance with said motor means for providing a percentage indication of a desired full point in the tank of fuel, the desired full point being determined by the adjustment of said first voltage divider means.

12. Bridge circuitry for indicating percentage of a desired full point in a tank of fluid to be gaged comprising, in combination:

first and second means for supplying first and second power signals respectively of a first phase, said second means being adjustable for supplying a signal of variable amplitude;

third means for supplying a third signal of a phase opposite said first phase;

amplifying means including input and output means;

tank unit capacitive means connected between said third means and said input means of said amplifying means for supplying a signal thereto indicative of fluid quantity;

fourth means connected to said second means, said fourth means being adjustable for providing a variable amplitude output signal in response to an input;

fifth means connected to said fourth means, said fifth means including output means for providing a variable amplitude output signal in response to an input;

reference capacitor means connected between said first means and said input means of said amplifying means;

sixth means connecting said output means of said fifth means to said input means of said amplifying means;

means connecting said output means of said amplifying means to said output means of said fifth means for adjusting the amplitude of the signal therefrom to minimize the effective input signal to said amplifying means; and indicator means connected to said amplifying means and operable in accordance with said amplifying means for providing a percentage indication of a desired full point in the tank of fluid, the full point being determined by the amplitude of the signal supplied by said fourth means.

13. Bridge circuitry for indicating percentage of a desired full point in a tank of fluid to be gaged comprising, in combination:

first and second means for supplying first and second power signals respectively of a first phase, said second means being adjustable for supplying a signal of variable amplitude;

third means for supplying a third signal of a phase opposite said first phase;

amplifying means including input and output means;

transducer means connected between said third means and said input means of said amplifying means for supplying a signal thereto indicative of fluid quantity;

fourth means connected to said second means, said fourth means being adjustable for providing a variable amplitude output signal in response to an input;

fifth means connected to said fourth means, said fifth means including output means for providing a variable amplitude output signal in response to an input;

reference means connected between said first means and said input means of said amplifying means, said reference means supplying a current substantially equal to a current supplied by said transducer means in a reference condition;

sixth means connecting said output means of said fifth means to said input means of said amplifying means; and means connecting said output means of said amplifying means to said output means of said fifth means for adjusting the amplitude of the signal therefrom to minimize the effective input signal to said amplifying means.

References Cited

UNITED STATES PATENTS

| | | | |
|---|---|---|---|
| 2,794,971 | 6/1957 | Hornfeck | 340—187 |
| 3,029,417 | 4/1962 | Dewey et al. | 340—178 |
| 3,037,385 | 6/1962 | Franzel et al. | 73—304 |
| 3,237,178 | 2/1966 | Valentine | 340—186 |

WILLIAM F. O'DEA, *Primary Examiner.*

D. MATTHEWS, *Assistant Examiner.*